UNITED STATES PATENT OFFICE.

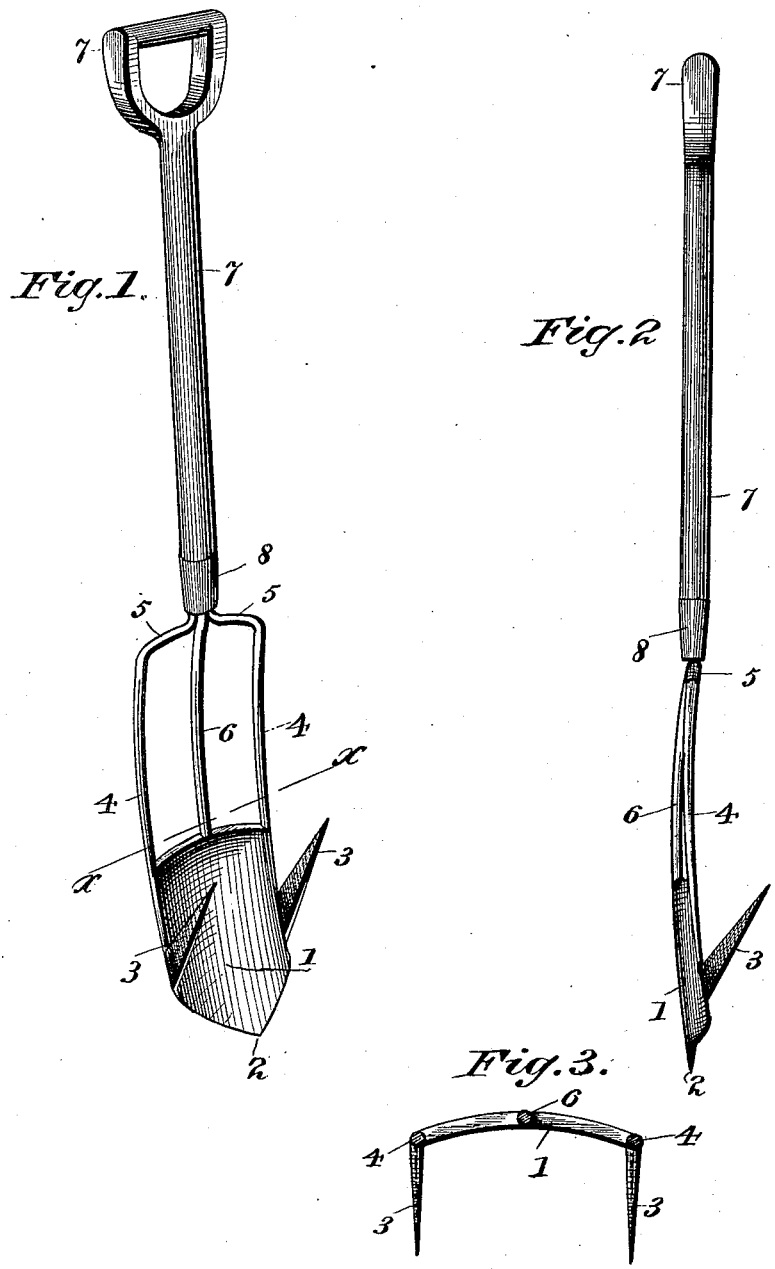

CHARLES McBRIDE, OF VICTOR, IOWA.

SPADE.

SPECIFICATION forming part of Letters Patent No. 337,602, dated March 9, 1886.

Application filed December 7, 1885. Serial No. 184,910. (No model.)

*To all whom it may concern:*

Be it known that I, CHARLES McBRIDE, of Victor, in the county of Iowa and State of Iowa, have invented certain new and useful Improvements in Spades; and I do hereby declare that the following is a full, clear, and exact description thereof, reference being had to the accompanying drawings, and to the figures of reference marked thereon, which form part of this specification, in which—

Figure 1 is a perspective view of my improved spade. Fig. 2 is a side view of the same. Fig. 3 is a sectional view on line x x, Fig. 2.

This invention relates to improvements in spades, and especially to that class designed for employment in draining and tile ditching; and it consists in the novel construction of the same, as will be hereinafter fully described, and pointed out in the claims.

Referring to the accompanying drawings, 1 designates the metallic head or blade of the spade proper, which is convex in cross-section, as shown in Fig. 3. The lower edge of the blade is preferably pointed or diamond-shaped at 2, for the purpose of entering the ground with less exertion by the workman or person using the spade. Slightly above the lower edge of the blade, on opposite sides of the same, are formed ears or projections 3 3, which have their lower edges sharpened, and forming a continuation of the cutting-edge of the blade, as shown. These ears 3 3 are preferably formed at right angles with the body of the spade, and extend forward and upward, as shown. From the upper edge of the blade extend rods 4, preferably but three in number, as shown, the inner rod being slightly behind the outer ones, to form a continuation of the convexity of the blade. The outer rods have their upper ends bent forward and inward at 5, and are united with the central rod, forming a shank, 6, by which the spade is secured on a proper handle, 7, by the usual ferrule, 8.

The spade, blade, ears, and rods may all be cut out from one piece of metal and shaped afterward; or, if desired, they may be made separate and welded together.

By forming the spade as described the ears cut the sides as the blade proper cuts the width of the trench, and the lower edges of the blade and ears, being slanting, will cut through grass and similar obstructions, and will not carry the same down with them and thus prevent their working. The rods 4 allow the spade to be used in wet clayey soil without the latter adhering to the blade and obstructing the work. They also serve to direct the entrance of the point 2 into the ground, preventing its being turned to one side, thus keeping the sides of the drain in line. The middle rod being bowed or convexed, as shown, greatly strengthens the blade, and will prevent the rods from becoming bent.

Having described my invention, I claim—

1. A spade having its lower cutting-edge beveled upwardly on each side from its center and provided with upwardly-extending ears, forming a continuous angular cutting portion with the edge of the blade, substantially as described.

2. The combination of the convex-pointed blade 1 and the rods 4, secured to the upper edge of the blade and forming a continuation thereof, and united at their upper ends to form a shank for attaching the blade to a proper handle, substantially as described.

3. In a spade, the combination of pointed blade 1, ears 3 3, formed on opposite edges of the blade, and rods 4 4, united to the upper edge of the blade and forming a continuation thereof, and having their upper ends united to form a shank, substantially as and for the purpose described.

4. As an improved article of manufacture, the herein-described ditching-spade, formed of a convex blade, 1, ears 3, and rods 4, all constructed and adapted to operate substantially as and for the purpose specified.

In testimony that I claim the foregoing as my own I affix my signature in presence of two witnesses.

CHARLES McBRIDE.

Witnesses:
H. WHITWORTH,
CHAS. REICHART.